(12) United States Patent
Bell et al.

(10) Patent No.: US 7,730,057 B2
(45) Date of Patent: Jun. 1, 2010

(54) COMPUTER DATA SYSTEMS IMPLEMENTED USING A VIRTUAL SOLUTION ARCHITECTURE

(75) Inventors: John W. Bell, Lees Summit, MO (US); Simon Ashley Field, Steeple Claydon Bucks (GB); Jason Michael Gartner, Markham (CA); Randall R. Holmes, Apple Valley, MN (US); Nancy A. Kopp, Wheaton, IL (US); William T. O'Connell, Etobicoke (CA); Paulo Roberto Rosa Pereira, Grapevine, TX (US)

(73) Assignee: International Business Machines Corporation, Armonk, NY (US)

( * ) Notice: Subject to any disclaimer, the term of this patent is extended or adjusted under 35 U.S.C. 154(b) by 1369 days.

(21) Appl. No.: 11/146,830

(22) Filed: Jun. 6, 2005

(65) Prior Publication Data
US 2006/0277155 A1   Dec. 7, 2006

(51) Int. Cl.
*G06F 17/30* (2006.01)
(52) U.S. Cl. .................. 707/720; 713/21; 713/22
(58) Field of Classification Search .............. 707/2, 707/10; 713/21, 22
See application file for complete search history.

(56) References Cited

U.S. PATENT DOCUMENTS

| | | | |
|---|---|---|---|
| 6,438,705 B1 * | 8/2002 | Chao et al. .................. 714/4 |
| 6,507,834 B1 * | 1/2003 | Kabra et al. ................. 707/2 |
| 6,535,975 B1 | 3/2003 | Thompson et al. |
| 6,687,735 B1 | 2/2004 | Logston et al. |
| 6,715,100 B1 * | 3/2004 | Hwang ......................... 714/5 |
| 6,744,436 B1 | 6/2004 | Chirieleison, Jr. et al. |
| 6,772,163 B1 * | 8/2004 | Sinclair et al. .............. 707/100 |
| 2002/0069369 A1 | 6/2002 | Tremain |
| 2002/0173984 A1 | 11/2002 | Robertson et al. |
| 2002/0174315 A1 * | 11/2002 | Yamamoto .................. 711/170 |
| 2003/0120593 A1 * | 6/2003 | Bansal et al. ................. 705/39 |
| 2004/0267920 A1 | 12/2004 | Hydrie et al. |

OTHER PUBLICATIONS

Krieger, et al., *HFS: A Performance-Oriented Flexible File System Based on Building-Block Compositions*, ACM Transactions on Computer Systems, vol. 15, No. 3, Aug. 1997, 286-321.

* cited by examiner

*Primary Examiner*—Hosain T Alam
*Assistant Examiner*—Jieying Tang
(74) *Attorney, Agent, or Firm*—Sawyer Law Group, P.C.

(57) ABSTRACT

Virtual solution architecture for computer data systems. In one aspect, providing an architecture for a computer data system includes creating a virtual solution architecture that includes a plurality of building blocks, each building block characterized by balanced operation, and mapping the virtual solution architecture to a physical solution architecture for the computer data system. Another aspect includes providing at least one balanced configuration unit (BCU) in a computer data system, the BCU including at least one balanced partition unit (BPU) that includes computer resources to provide balanced operation for the BPU.

20 Claims, 11 Drawing Sheets

| Layer | Term | Definition |
|---|---|---|
| 1 | BPU | Balanced partition unit<br>- A logical (functional) concept rather than physical.<br>- The BPU is used to refer to the resources required or used by a single database partition, and for this reason is useful to use as a basis for estimating overall system size.<br>- This is the lowest level of detail for BCU architecture and only exists for BCU types that are dedicated to DB2 UDB. |
| 2 | BCU | Balanced Configuration Unit<br>- A single operating system image, either provided via a partition (for example LPAR) or individual server.<br>- A number of BCU types exist to deliver different distinct functions to the overall architecture, for example, data, administration, and so on.<br>- This will be the top layer of an implementation where only a single BCU is required, or high availability is not a requirement.<br>- Details the individual hardware components that are required to deliver a balanced performance.<br>- Consists of one or more BPUs. |
| 3 | HA-BCU | High availability -- Balanced Configuration Unit<br>- Provides high-availability solution to the BCU layer.<br>- Tolerance is provided to any single point of failure that may exist at the BCU layer below.<br>- Provides the implementation relationship between two or more BCUs.<br>- Consists of two or more BCUs. |

FIG. 1

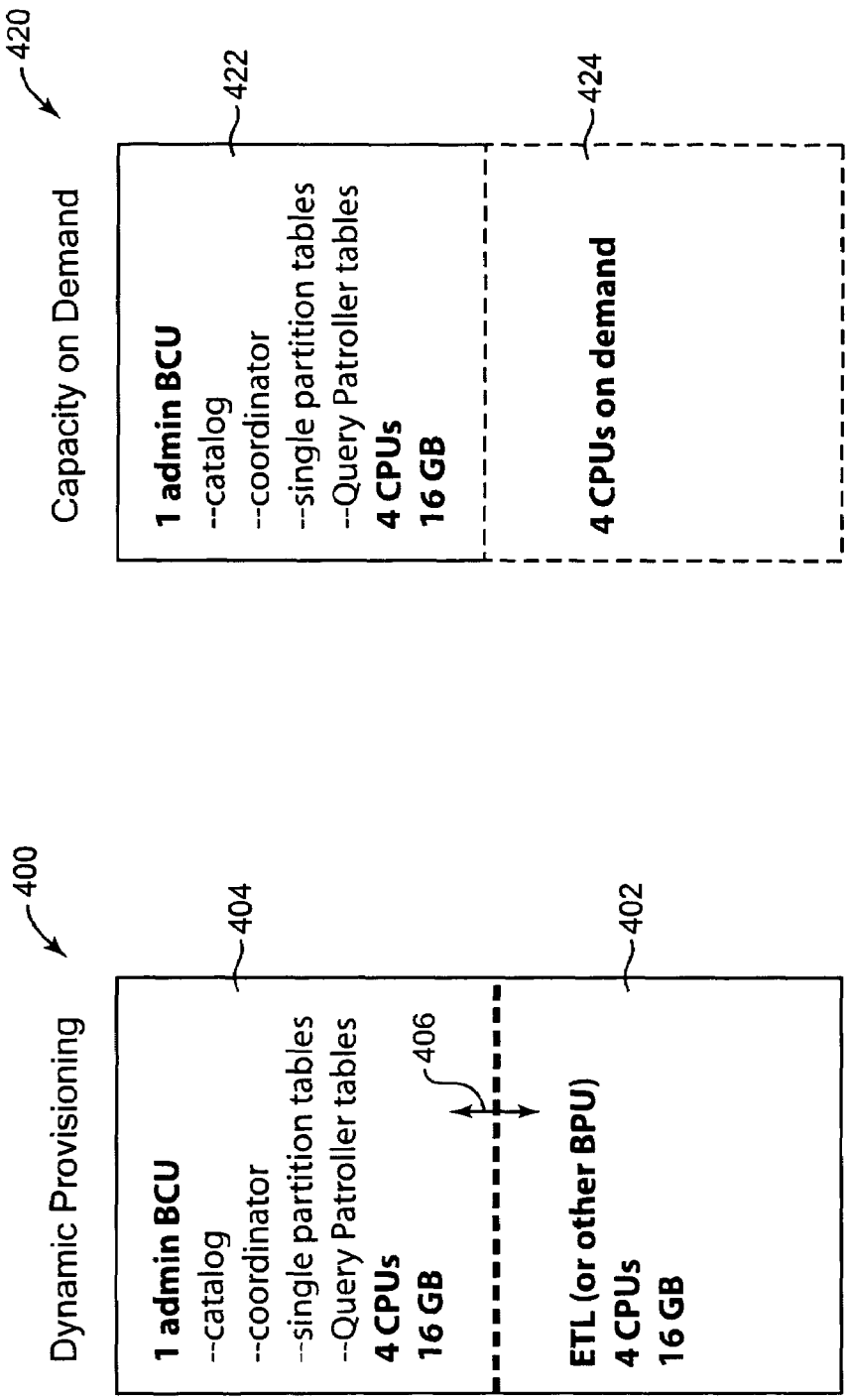

COMPUTER DATA SYSTEMS IMPLEMENTED USING A VIRTUAL SOLUTION ARCHITECTURE

FIELD OF THE INVENTION

The present invention relates to computer data systems, and more particularly to development and implementation of an architecture for balanced computer data systems.

BACKGROUND OF THE INVENTION

Data is collected in databases to organize information and allow efficient access to the data. One type of database system that is typically used by businesses or other organizations is a data warehouse. A data warehouse is a repository storing integrated information for efficient querying and analysis, and generally is a combination of many different databases, e.g., across an entire organization. Information is extracted from different sources as it is generated or updated, and then translated into a common data model and integrated with existing data at the warehouse. When a user query is submitted to the warehouse, the needed information is provided with differences between data formats already resolved. This makes it much easier and more efficient to run queries over data that originally came from different sources. Additional advantages of data warehousing include easy and efficient execution of complex queries, a single data model and query language used by end users, simpler system design, and reliable and safe data repository.

Other data systems besides data warehouses can also be used. For example, a "data mart" is a database, or collection of databases similar to a data warehouse, but usually smaller and focused on a particular subject or department in an organization, and may be a subset of a data warehouse. Other data systems may provide for the transformation or loading of data, rather than storing data in databases.

Like other computing systems, a data warehouse is a collaboration of processors, memory, disk, operating system, database engine, applications, data model, and business requirements. In a business environment, a data warehouse is often connected to a corporate network to fulfill a number of essential functions, such as end-user connectivity, data transfers, backup and restore, remote management, potential communication in extract, transform, and load (ETL) processes, and so on. Development of a data warehouse includes development of systems to extract data from operating systems plus installation of a warehouse database system that provides managers flexible access to the data.

One problem with current data warehouses is that their components are difficult to balance and it is difficult to maintain that balance over time as the warehouse is upgraded or is provided additional data to store. A balanced collaboration of components in the data warehouse is essential for successful operation, where all the components have been chosen to fit or integrate with each other for a mixture of compatibility, performance, and reliability reasons. If a proper balance is not maintained throughout the components of a data warehouse solution, the users of the warehouse may not obtain the benefit of the massively parallel functionality of database systems or get full value out of all the components of the system.

Accordingly, what is needed is an architecture for data warehouses or other data systems that promotes flexible and efficient operation over time and a proper balance throughout its components, such that the functionality of the system can be used efficiently and effectively. The present invention addresses such a need.

SUMMARY OF THE INVENTION

The invention of the present application relates to an architecture for balanced computer data systems. In one aspect of the invention, a method for providing an architecture for a computer data system includes creating a virtual solution architecture that includes a plurality of building blocks, each building block characterized by balanced operation, and mapping the virtual solution architecture to a physical solution architecture for the computer data system.

In another aspect, an architecture for a data warehouse system includes at least one data balanced configuration unit (BCU) and an administration BCU. The data BCU includes at least one data balanced partition unit (BPU) that corresponds to balanced computer resources used by a data partition of a database. The data BPU stores partitioned database data. The administration BCU includes a catalog BPU corresponding to a database partition where a database catalog resides.

In another aspect, an architecture for a computer data system includes a plurality of balanced partition units (BPU) and at least one balanced configuration unit (BCU). Each BPU includes computer resources to provide a balanced operation for the BPU, and the BCU includes at least one BPU and specifies a system image of computer hardware and software.

The present invention provides an architecture for data systems that promotes a balanced, efficient, and flexible system. The system uses balanced building blocks to allow parallel functionality of a data system like a data warehouse to be fully exploited, as well as promoting full utilization of components and avoidance of bottlenecks in the system. Furthermore, much flexibility is obtained to accommodate the system changing and growing over time.

BRIEF DESCRIPTION OF THE FIGURES

FIG. 1 is a block diagram illustrating an architectural hierarchy for the virtual solution architecture of the present invention for a data system;

FIG. 11 is a diagrammatic illustration of an example of dynamic provisioning between BCUs of a system;

FIG. 12 is a block diagram illustrating an example system having capacity on demand;

DETAILED DESCRIPTION

Figure 2:
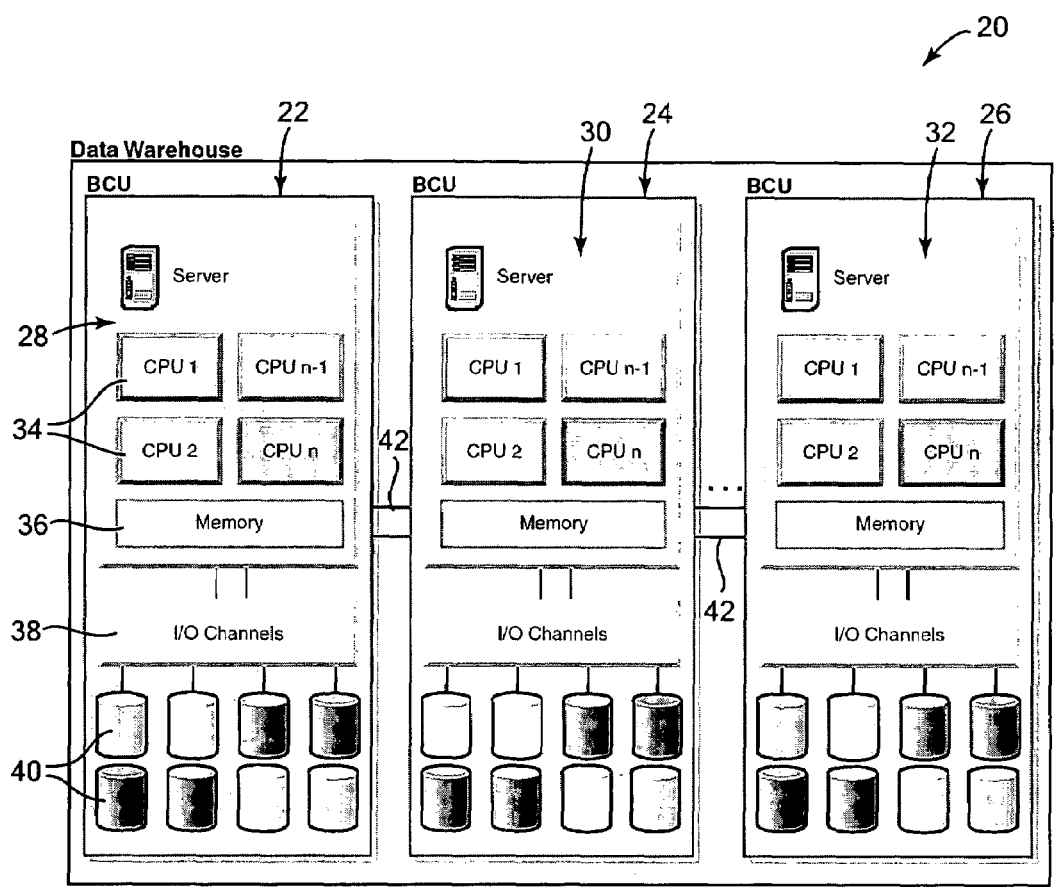
FIG. 2 is a block diagram a generic example of BCUs used in a data warehouse system according to the present invention.

The present invention relates to computer data systems, and more particularly to development and implementation of an architecture for balanced computer data systems. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is mainly described in terms of particular systems provided in particular implementations. However, one of ordinary skill in the art will readily recognize that this method and system will operate effectively in other implementations. For example, the system implementations usable with the present invention can take a number of different forms. The present invention will also be described in the context of particular methods having certain steps. However, the method and system operate effectively for other methods having different and/or additional steps not inconsistent with the present invention.

To more particularly describe the features of the present invention, please refer to FIGS. 1-14 in conjunction with the discussion below.

The present invention addresses a technical methodology known as a "virtual solution architecture" (VSA). The VSA is a concept that defines a complete data system solution, which can be for an organization, such as a business, agency, or other application. The data system solution can take different forms in different embodiments, and involves the manipulation and/or storage of data. For example, a data system can include a database system that is used by a business for a "business intelligence" application. Such a system can be a data warehouse or data mart for data collection, access, and storage, administration functions, extraction-transformation-loading (ETL) operations of the database, and include one or more application programs for users. In other embodiments, the VSA can define a data system not including a database, e.g., a system that uses ETL and/or application operations, such as data storage, or data manipulation, such as transformation of data to a format needed by an application.

A VSA is hardware independent and is created as a virtual solution that can be implemented with any hardware that is suitable for the functionality defined by the VSA. Thus, the VSA can remain a stable, ever progressing architecture that is hardware agnostic and does not depend on a specific hardware, allowing it to be flexible as new hardware is developed. The VSA is a prescriptive approach to building and deploying a data system, such as a data warehouse, in a simple, scalable way utilizing a building-block approach. The prescription comes in form of a methodology for implementing a data system on the latest available hardware. The VSA concept allows the implementation of end-to-end systems capacity, i.e., allows the implementation of an entire system including a data warehouse, extract-transform-load operations, applications, and database administration. VSA also allows architectural sizing and planning for systems.

Once the VSA has been defined for a solution, it can then be mapped to a "physical solution architecture" (PSA). Since the VSA is hardware independent, it can be mapped to multiple PSAs. The PSA is the actual physical system, defined by hardware and software components. For example, once the VSA has been defined, a PSA can be created on any suitable hardware that can implement the VSA, such as a Power Server from IBM Corporation, a System 390 system from IBM Corp., an x86 server (using, for example, microprocessors from Intel Corporation), or other hardware that can perform the desired functionality.

Describing the entire solution for a data system is critical to the VSA of the present invention. In previous methods, for example for data warehouses, a solution only including a data warehouse was described. In comparison, for a VSA, a balanced, complete data system is defined for a data warehouse, which not only includes a database, but also administration servers, ETL servers, and application servers. The interactions between these various components of an entire data warehouse is critical to the efficiency obtained by the VSA of the present invention.

The "balanced" configuration of the present invention includes choosing a combination of processing power (CPUs), memory, I/O, storage, software, database partitions, and database configuration parameters under a single operating system to make up a single practical building block that is scalable. Then, larger systems can be configured by combining these building blocks into one system that performs fast and efficiently, and is flexible as the system changes and grows over time.

Architecture Hierarchy

FIG. 1 is a block diagram illustrating an architectural hierarchy 10 for the virtual solution architecture of the present invention for a data system. This architectural hierarchy includes three levels, a Balanced Partition Unit (BPU) layer 12, a Balanced Configuration Unit (BCU) layer 14, and a High-Availability Balanced Configuration Unit (HA-BCU) layer 16. Each level describes the solution components, performance, and capabilities appropriate to the level. One reason for these levels is to provide the necessary information required for an architect or system designer to size and understand performance expectations.

Much of the description herein refers to an embodiment in which a data warehouse is being implemented using a format such as DB2. Other database systems and data systems can also be used with the VSA structures described herein.

The first layer of the architecture is the BPU layer 12, at which the Balanced Partition Unit (BPU) sits. The BPU is an entity of the present invention that is considered to be the smallest basic building block of the system. The BPU is a logical (functional) concept rather than a physical one. A BPU refers to the resources needed in order to be able to serve its function, including computer power, memory, I/O capabilities, software, and operating system. In the example shown in FIG. 1, the BPU is used to refer to the resources required or used by a database partition, such as a software data partition for the DB2® database.

The BPU is the lowest level of detail for the VSA architecture and, in a data warehouse embodiment, exists for the function types that are dedicated to the database format being used (e.g., DB2 Universal Database (UDB)). Because in most data warehouse architectures the database is the only software component capable of supporting data partitioning, the BPU can be defined to refer to one database partition. When the BPU is used to refer to the resources required or used to service a DB2 partition, it can be useful to use as a basis for estimating overall system size. In other applications, the BPU can be used to refer to resources required by a processing partition or other structure. For example, some ETL tools support a partitioned approach, and the BPU may encompass these ETL tool requirements.

BPUs can be conceptualized based on their usage. The following BPUs are described in terms of their different uses for a data warehouse embodiment. Although a single BPU can service multiple types and/or usages, it is generally good design in databases to, for example, use separate database partitions for data, catalog & coordinator, ETL, and application BPUs.

Data BPU. The data BPU is a database partition dedicated to managing and processing data within the database. This BPU can be dedicated to storing partitioned database data. In a database implementation, a data BPU can be a multi-partition BPU that includes multiple data partitions, or a single partition BPU that includes only a single-partition data partition.

Coordinator BPU. A coordinator BPU is a database partition that can manage user database connections, access to the database, and coordinates processing of queries (from users to the database) across data and catalog BPUs.

Catalog BPU. This BPU can be a database partition where the database catalog resides. This partition is responsible for managing and processing database metadata (catalog) data within the database. The Catalog BPU can be combined with the Coordinator BPU.

ETL BPU. This BPU is a conceptual partition where the ETL processing occurs and has all the resources that the ETL requires. This BPU may or may not also include a database partition, depending on the embodiment (e.g., the ETL BPU may include processing partitions but not database partitions in some embodiments).

Application BPU. The application BPU is a conceptual partition where the application processing occurs and has all the resources that the application requires. This BPU need not include a database partition.

The second layer of the architecture as shown in FIG. 1 is the BCU layer 14, where the Balanced Configuration Unit (BCU) sits. A BCU is made up of one or more of the balanced partition units (BPUs) described above.

The BCU provides a single operating system image (including hardware and software) either provided via a computer partition (for example a computer logical partition or LPAR) or individual server, and can be defined in any of a number of types to deliver different distinct functions to the overall architecture (such as data, administration, etc.). The BCU details the individual hardware components (physical specifications) that are required to deliver a balanced performance. The second, BCU layer is the top layer in any embodiment where only a single BCU is required, or high availability is not a requirement (high availability is described below).

The BCU a scalable building block for systems architected by the present invention, and is a physical instantiation and realization of the VSA. A BCU provides a building-block approach to constructing data warehouses (or other data systems) out of open, general-purpose components. The BCU building blocks are constructed of computer, storage, and operating system components that are known to function well together, and balance each other's characteristics. The BCU is the minimum replicable hardware and software stack necessary to start or expand the infrastructure of, for example, a business intelligence (BI) system, and provides a scalable performance ratio of disk I/O to memory to CPU to network.

As a generic example of BCUs used in a system, FIG. 2 is a block diagram of a data warehouse 20 including BCUs of the present invention. BCUs 22, 24, and so on, up to BCU 26, are provided within the warehouse 20. Each BCU 22, 24, and 26 provides a server 28, 30, and 32, respectively. For example, server 28 includes one or more CPUs 34 and memory 36. The server 28 is in communication with dedicated I/O channels 38, which can access the data storage 40 that is dedicated to that BCU 22. The other BCUs 24 and 26, if they have the same function and workload as BCU 22, have identical dedicated components, so that each BCU is an independent building block. All of the BCUs 22, 24, and so on, can communicate with each other via communication links 42.

A well-balanced data warehouse has several different types of work happening. Separating out this work and understanding the different characteristics allows for better balance in the overall design. For this reason, different types of BCUs have been defined, each fulfilling a different function within the data warehouse environment. The following BCU types have been identified. Each of these BCUs supports different workloads, and can be expected to be configured differently.

Data BCU. A collection of data BPUs, such as DB2® database partitions, that is dedicated to managing and processing a part of the user data within the database. That is, the data BCU contains the tables that reside in multiple-partition database partition groups. (A database partition group is a named set of database partitions, and can consist of one or more database partitions.)

Administration BCU. One or more BPUs, such as database partitions, that provides a database catalog and coordinator function. The administration BCU may also contain non-partitioned table data (that is, tables that are stored in single-partition database partition groups).

Extract, transform, and load (ETL) BCU. The ETL BCU is responsible for processing all (or an element) of the extract, transformation, and load work for the data warehouse. This typically involves use of a export, transform, and load (ETL) tool and/or other ETL programs. This BCU includes one or more ETL BPUs.

Application BCU. A BCU that is responsible for the application processing of the data warehouse, i.e., the processing of an application that interfaces a user with the data warehouse. Popular applications such as WebSphere Application Server (WAS) from IBM Corp., or other applications from companies such as SAS, Cognos, or Business Objects, can be used. This BCU includes one or more Application BPUs.

Multiple types of BPUs can be provided in a single BCU. For example, the coordinator BPU and catalog BPU can generally be found on an administration BCU.

The balance of components permitted by the use of BCUs is a strong advantage of the present invention. Balance is a key factor when designing a data warehouse. If the proper balance is not maintained throughout the components of the system, users may not obtain the benefit of massive parallel functionality of the database system used in the data warehouse (such as in DB2). A parallel database architecture also allows increased performance and scalability as applied with the present invention.

Because the operation of the individual components is well understood, and has also been verified by rigorous system and performance testing, recommendations can be made as to the number of building blocks (BCUs) that are required to build a data warehouse based on the projected volume of data and performance that the data warehouse is expected to hold. Knowing the capacity and performance of each building block in advance allows architects to reverse engineer the expected requirements of a data warehouse into the BCU building-block model, which can greatly reduce the problem of over estimating the resources required to implement the data warehouse, and the resulting total cost of ownership (TCO).

The goal of the BCU is to provide a prescriptive and quality approach through the use of a proven balanced methodology. By using the BCU concept when implementing a data warehouse system or other data system, the development time can be reduced and the total cost of ownership of the warehouse can be reduced. The prescriptive approach used by the BCU minimizes the complexity of warehouse design and implementation via standardized and tested designs and practices that increase the quality and manageability of the warehouse.

The BCU provides many benefits. For example, the BCU takes a complex concept and breaks it down into more easily understood units: the BCU method is simpler than other methods used previously; scaling the warehouse is simplified; as organizational requirements change and more data sources are identified, BCUs can easily grow the warehouse to meet new workload demands; over time, workloads deployed on consistent BCU configurations will lead to improved sizing and capacity-planning processes for the data warehouse; the prescriptive approach reduces the risk of sizing, deployment, integration, and planning for growth and provides the best practice knowledge and intellectual capital, because by defining building blocks, performance, scalability, and reliability can be better understood; and a consistent approach and configuration allows more focused quality testing, therefore reducing the number of variables and reducing risk.

As an example, two different BCU physical solutions can be provided: one being a BCU for the AIX operating system from IBM Corp., and one being a BCU for a Linux operating system. Examples of such physical implementations are described below with respect to FIGS. 13 and 14. Each BCU has different characteristics based on the underlying hardware, operating system, and storage devices used. Although the operating systems are different, both the AIX and Linux specifications can leverage the building-block approach of the present invention.

Referring back to FIG. 1, a third layer 16 is provided at the highest level of the architecture hierarchy 10, at which a High Availability Balanced Configuration Unit (HA-BCU) is positioned. An HA-BCU is a collection of two or more BCUs and provides the implementation relationship between two or more BCUs. The HA-BCU also provides a high-availability solution to the BCU layer 14, i.e., it allows continuous and/or failover availability of all data in the data warehouse when a failure occurs in a BCU. Tolerance is provided to any single point of failure that may exist at the BCU layer 14.

An HA-BCU refers to a collection of BCUs that provide mutual support to each other in providing take-over capability, i.e., the capability to take over operations from a failed BCU. High availability (HA) is the term used herein to describe systems that run and are available to users as continuously as possible. This includes the elimination of single points of failure in the system and transparently managing failover situations. For example, to keep a database manager running, another database manager must take over if the production system fails. This configuration is called failover. Failover capability allows for the transfer of workload from one system to another when a hardware failure occurs. High availability is used herein to refer to system failover protection. High availability is described in greater detail below with respect to FIGS. 8-10.

Figure 3:
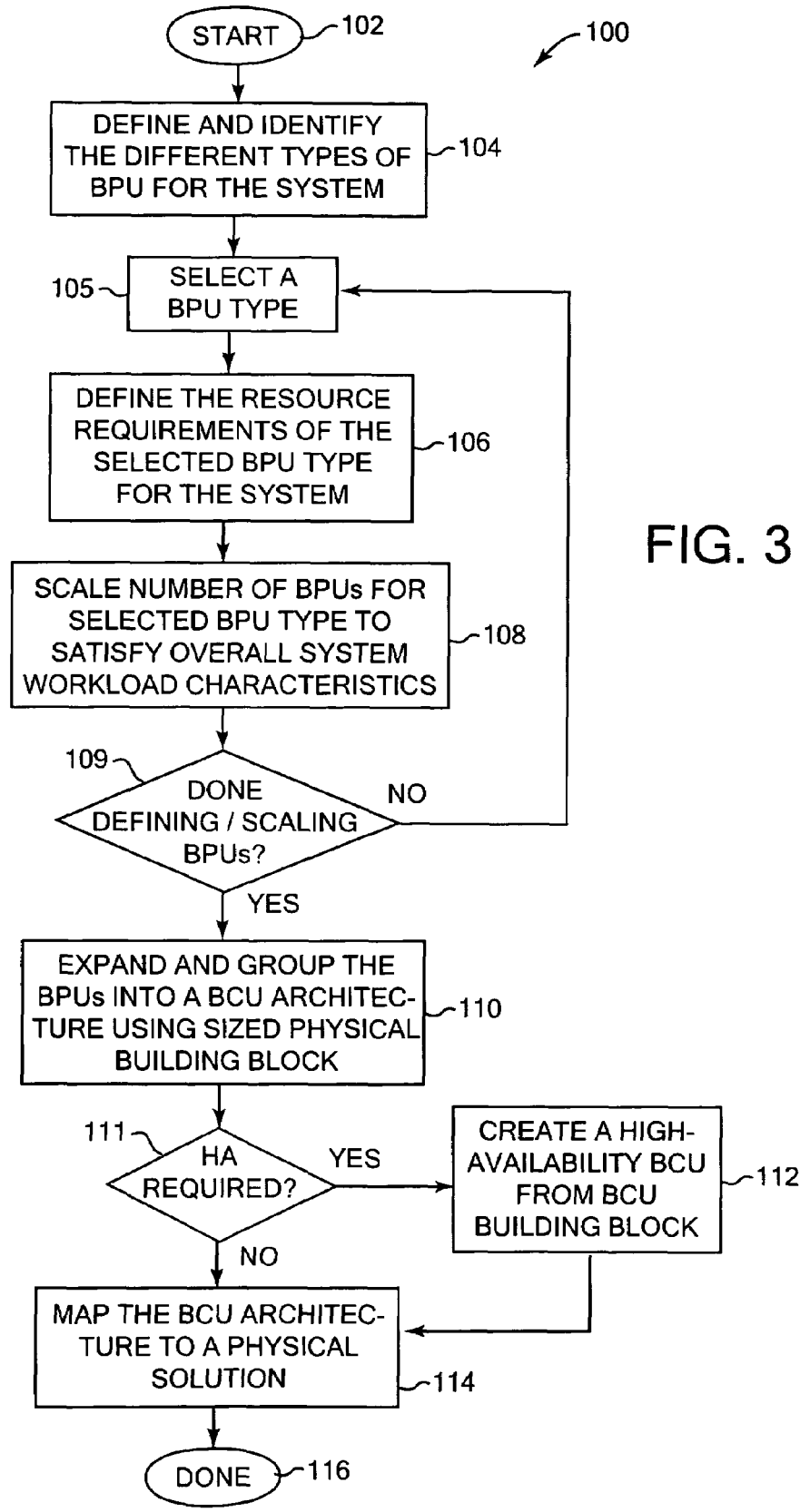
FIG. 3 is a flow diagram illustrating a method of the present invention for creating a virtual solution architecture and providing a physical solution for a data system.

FIG. 3 is a flow diagram illustrating a method 100 of the present invention for creating a virtual solution architecture and providing a physical solution for a data warehouse or other data system.

The process begins at 102, and in step 104, the balanced partition unit (BPU) for the desired system is defined and identified. As explained above, the BPU is defined as the smallest building block of the system, and can be used for several different functions, including data, catalog, coordinator, ETL, and application. This step identifies what that smallest building block is. For example, in many of the examples described herein, the BPU is defined in terms of a database partition, e.g., a DB2 Software Partition. In some systems, different BPUs are identified additionally or alternatively; for example, an ETL BPU may be defined in terms of a processing partition instead of a database partition. In some systems, there may not be constituent building blocks, and so the BPU would be identified as the entire system, e.g. the entire ETL program.

In step 105, a BPU type is selected. The system will require a number of different types of BPUs as described above (data, catalog, coordinator, etc.). Each type of BPU may have different requirements and workload characteristics; e.g., a data BPU may have different requirements than a catalog BPU. One of the BPU types required for the system is selected in step 105. In step 106, the resource requirements are defined for the BPU type selected in step 105. The BPU building block is a logical structure that is defined not with physical components, but with the resources in the system it requires.

The requirements for a BPU type can be specified in terms of hardware and software requirements. Thus, a BPU has hardware requirements of processing power (e.g., number and power of CPUs used in the BPU), memory (bytes of memory needed for the BPU), and input/output (I/O), such as I/O channel characteristics and bandwidth (e.g., Megabytes per second, I/O per second). Furthermore, the BPU has software requirements as to what software features and processing it needs from an operating system, database software, ETL software, and application software (interface to user). In addition, other requirements for the BPU can be specified, such as storage space for data BPUs (how much physical disk space allocated per BPU), or the configuration of the BPU in relation to the system, such as communication channels between the database partition of the BPU and physical hardware of the system, how memory is to be used, communication between the operating system and physical hardware resources, communication between the database and operating system, etc.

The requirements of the BPU type are chosen relative to one another so as to create balance in the BPU system, e.g., to not create a system in which some system components are underutilized or inefficient, and to promote the avoidance of bottlenecks in the system. The system is only as fast as its slowest or most inefficient component. For example, there must be balance between the CPUs, memory, and I/O of the BPU such that there will not be a shortage of memory, and there will not be extra processing power or bandwidth that is unutilized for system operation. Each resource should be utilized as efficiently as possible for system operation. Thus, for example, a certain amount of memory will be appropriate for a certain amount of processing power and I/O capability.

The requirements for the BPU can be determined based on any number of known techniques, such as testing, trial and error, benchmarking, past experience with the same or similar systems, best practices, rules of thumb, etc. The application for which the data warehouse (or other data system) is being designed and implemented helps determine the requirements of the BPU type. For example, prior experience with data warehouse systems can allow knowledge of average business-intelligence workloads for systems, in such an embodiment. Experience can be gained concerning the typical ratios of system resources that are required to deliver a balanced system. By using these ratios, the system will, for the most part, have higher levels of I/O performance without too much I/O wait on the server, and without being CPU bound.

The BPU requirements can also change over time as component technology changes. For example, one CPU per BPU may be required at one point in time, however, as CPU processing power increases on each CPU, only one-half a CPU may be needed in the future for the equivalent configuration. However, as the system grows, a full CPU with greater processing power may be needed per BPU to avoid bottlenecks.

In step 108, the number of BPUs of the selected type is scaled to satisfy the overall system workload characteristics. This scaling is performed based on the individual workload capabilities of each BPU. For example, if it is known that there will be a workload on the data warehouse requiring 1000 GB of data processing capability, and the data BPU type was defined as having 100 GB of processing power, then it is known to scale up the number of data BPUs to 10. The workload of each individual BPU is increased to satisfy the requirements of the system by increasing the number of appropriate BPUs. This step therefore indicates how many of the selected type of BPU is required.

In a data warehouse embodiment, a database that readily allows the building block approach of the present invention can be used. For example, a DB2 data warehouse can include a number of virtually identical DB2 database partitions, using the shared-nothing (massively parallel processing) architecture. This provides a simple approach for designing, sizing, and configuring a system by looking at the resource and performance requirements for an individual database partition (BPU), then extrapolating this to determine the total system required for N database partitions.

In step 109, it is checked whether all the types of BPUs for the system have been defined and scaled in steps 106 and 108. If not, there are other types of BPUs needed for the system that must still be defined and scaled, and the process returns to step 105 to select the next BPU type for steps 106 and 108.

Figure 4:
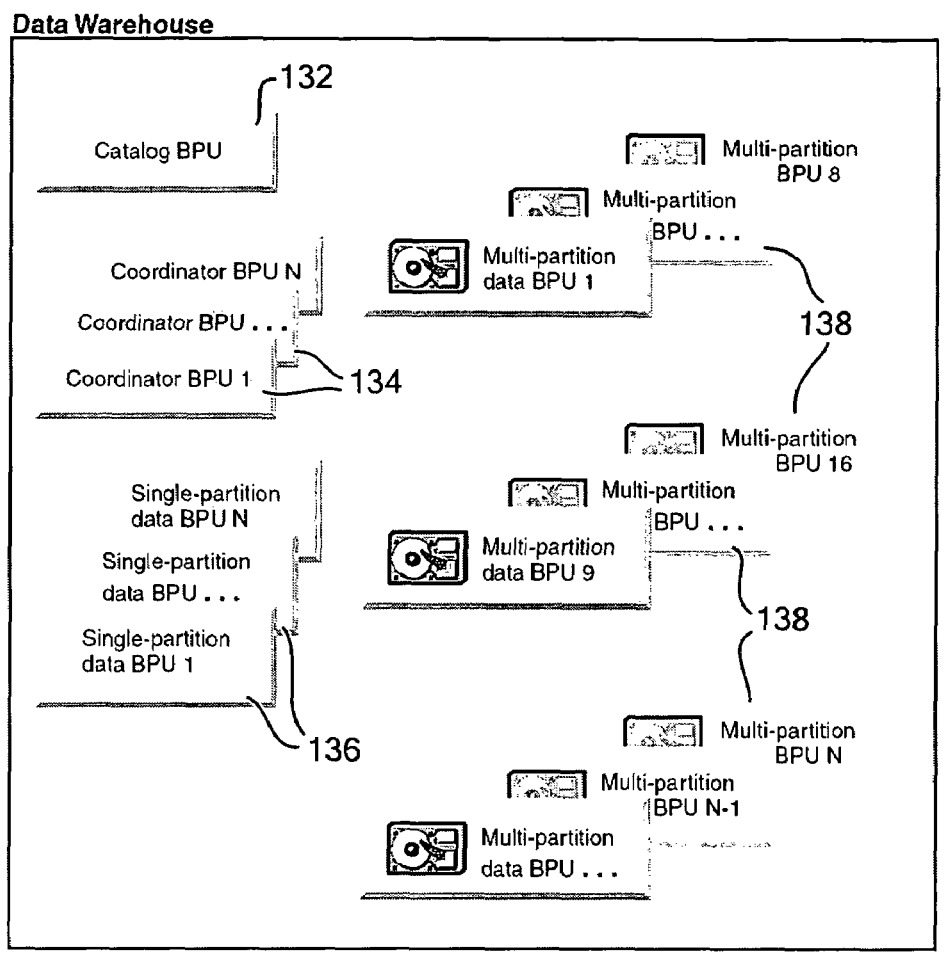
FIG. 4 is a block diagram illustrating an example of a general data warehouse solution which has scaled up an appropriate number of BPUs to meet its system requirements.

As an example of step 108, FIG. 4 shows a block diagram illustrating an example 130 of a general data warehouse solution which has scaled up an appropriate number of BPUs to meet its system requirements as in step 108. This example uses DB2 for the database software system and uses Data Partitioning Feature (DPF) partitions as the BPU blocks. This embodiment includes multi-partition data BPUs (DB2 database partitions), since that type of BPU is often the most numerous type in a data warehouse environment.

Data warehouse 130 includes a catalog BPU 132, a number of coordinator BPUs 134, a number of single-partition data BPUs 136, and a number of multi-partition data BPUs 138. Based on the requirements of the system as determined in step 106, the appropriate number of coordinator BPUs 134, single-partition data BPUs 136 (which can be used to support small tables, as explained below), and multi-partition data BPUs 138 are selected to fulfill those requirements.

Each data BPU 138 including partitioned data is ensured to have equal data volume, and hence equal data access workload, thus the workload is distributed across all the data BPUs. Each multi-partition data BPU 138 should have an equal workload in terms of data accessed, and CPU, memory, storage, and network performance requirements. The concept of the BPU for multi-partition data (data BPU) is driven by the need to balance the data and performance requirements for a typical workload. Each data BPU 138 is configured identically.

A DB2 UDB with DPF warehouse has one catalog BPU 132, with catalog information being cached as required to any other coordinator BPUs 134 during query processing. A data warehouse can have multiple coordinator BPUs 134. In principle, any type of database partition can act as a coordinator BPU, because the function of coordinating a query occurs at the database partition where an end-user or application connects.

Figure 5:
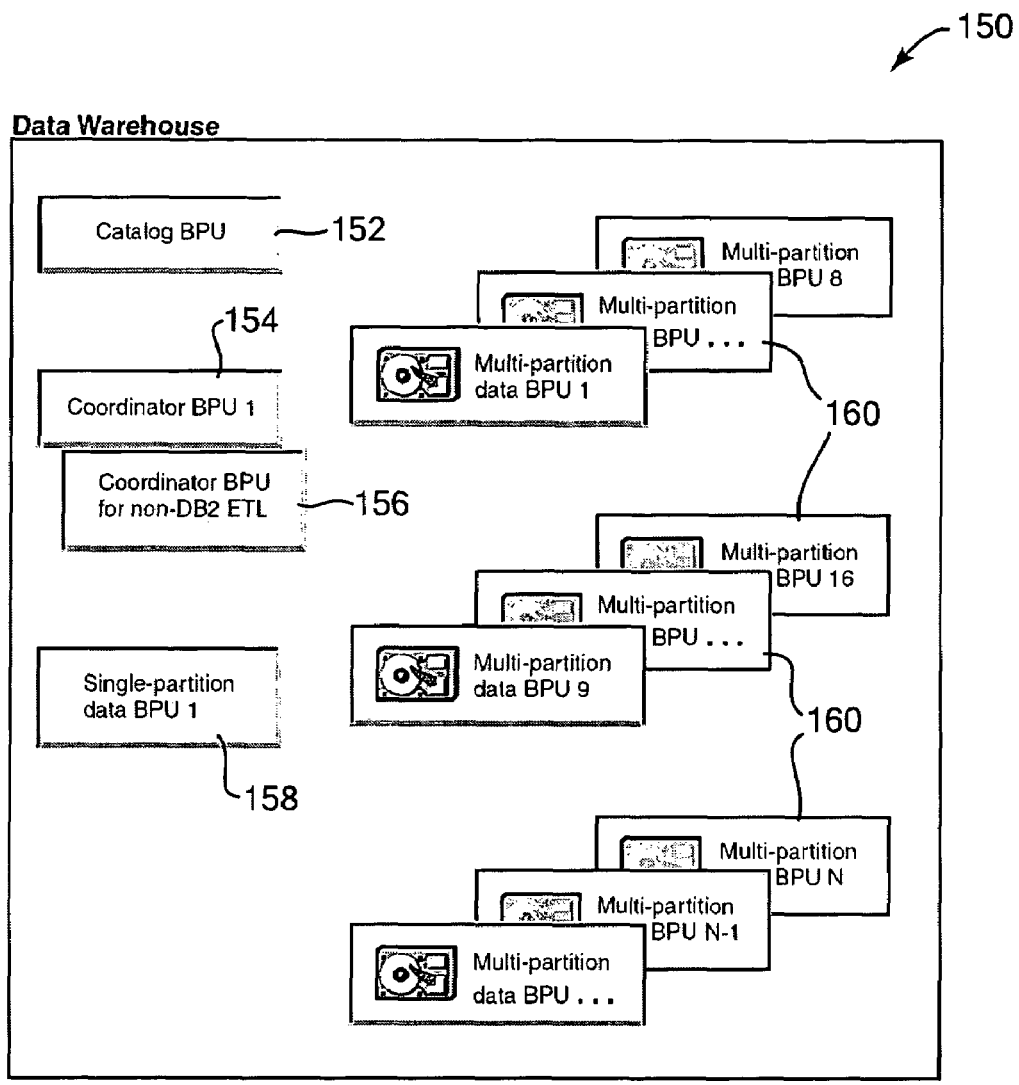
FIG. 5 is a block diagram illustrating a more specific embodiment for the general solution of a data warehouse as in FIG. 4.

Another example is shown in FIG. 5, which is a block diagram illustrating a more specific embodiment 150 for the general solution of a data warehouse. Data warehouse 150 is similar to the warehouse 130 of FIG. 4, except that it specifies that one coordinator partition (and one coordinator for an ETL product) and one single-partition database partition (for non-partitioned tables) is used. Data warehouse 150 thus includes a catalog BPU 152, a coordinator BPU 154, a coordinator BPU for non-DB2 ETL 156, a single-partition data BPU 158, and a number of multi-partition data BPUs 160.

The single coordinator partition 154 is separate from the data BPUs and is provided so that the database partition used for connections and coordination work is clearly defined.

If an extract, transfer, and load (ETL) product is used that does transformation work outside the DB2 database, this product can be configured to use the coordinator BPU 154. In this embodiment, the ETL transformation work is put on a separate server.

When equating the system of FIG. 5 to a DPF environment, it can be assumed that the small tables are stored in one single-partition database partition group (which maps to the single-partition data BPU 158), while the large tables are stored in one multiple-partition database partition group (which spans the multi-partition data BPUs 160).

Single-partition BPUs support small tables. Small tables are kept on one data BPU because this generally provides better overall performance. Many single-partition data BPUs can be created, each supporting different small tables, but this adds complexity to the data warehouse. The preferred approach is to have one data BPU support all small tables (or single-partition data). It should be noted that single-partition tables should remain small and not grow dramatically over time (e.g., dimension tables, such as a time dimension based on 'DATE').

Referring back to the method of FIG. 3, when all the types of BPU for the system have been defined and scaled, then the process continues from step 109 to 110. In step 110, the BPUs are expanded and grouped into a BCU architecture based on a sized physical building block. The BCU architecture specifies how the BPUs are to be implemented according to system component requirements. The BCU architecture is closer to the physical components that will be needed, and thus provides a further step towards actual implementation.

The sized physical building block that is used to define the BCU architecture is a general specification of physical computing resources including hardware and software (i.e., a "system image" or physical server image) which has been decided to be used based on a number of different reasons and analysis. The factor can include component cost, performance, stability, fault tolerance, high availability, ease of installation and implementation, industry standards, size, ability to scale, etc. Factors can also include the balance in performance a particular component can provide in relation to other components.

The sized physical building block is also related to BPU requirements. For example, if it is determined that an 8-CPU machine will be used in the actual implementation of the data warehouse, that machine specification is used as a BCU building block to incorporate and group the BPUs. Thus, in this example, if one CPU is required per BPU, then 8 BPUs can be included in one BCU. The BCU defined by the physical building block determines how many BCUs are required to fit the BPUs determined in steps 106 and 108. Other systems might use two CPUs per BPU, for example, if the operating system does not perform as well with higher numbers of CPUs, or granularity of growth and sizing of the system needs to be small.

The BPUs of step 108 allow data warehouse sizing and capacity planning. For example, assuming that a data BPU is capable of supporting 125 GB of raw data, extrapolating for a 4 TB raw-data data warehouse, would require approximately 32 BPUs. This number can then be used to extrapolate the required number of BCUs—assuming eight BPUs to a BCU, four data BCUs would be required. DB2 balances the data and resources equally among the database partitions, when the system requirements for a BPU have been sized (in terms of CPU, memory, and I/O), this information can be used to determine the overall hardware configuration for the database. Thus, the requirements of the BPU are scaled up, then mapped at BCU level, and this forces designer to think of logical requirements first, then physical requirements. Designing a system from such balanced building blocks is easier at the BPU level than at the BCU level.

The BCU is useful at the system design and implementation stage. The physical hardware, storage, and database configuration can be designed at the BCU level, and this design can then be replicated for all appropriate BCUs in the system. This greatly simplifies initial system design and configuration, ongoing administration and maintenance, and future capacity upgrade or system enhancement planning.

Figure 6:
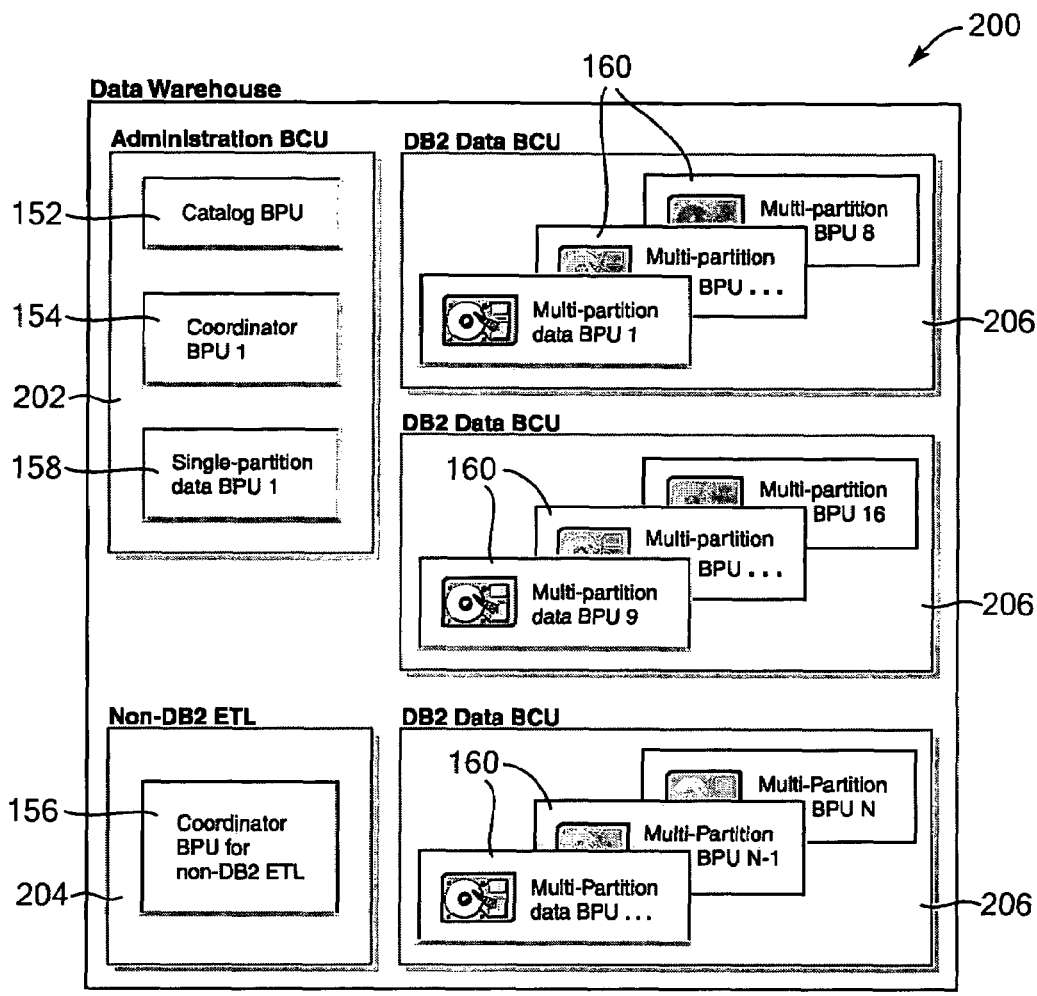
FIG. 6 is a block diagram illustrating a data warehouse that has been defined using a BCU architecture.

For example, FIG. 6 is a block diagram illustrating a data warehouse 200 that has been defined using a BCU architecture as in step 110 of FIG. 3. In this case, the data warehouse 150 of FIG. 5 has been further specified and developed into the BCU system of FIG. 6. The BPUs of the data warehouse logical solution of FIG. 3 are mapped to physical computing resources, indicated by particular groups that are designated as BCUs. This mapping of DB2 database partitions on a physical server image with a defined balance of computing resources for each partition leads to defining the BCUs as shown in FIG. 6. Thus, data warehouse 200 includes an administration BCU 202, a non-DB2 ETL BCU 204, and a number of data BCUs 206. System 200 can be a "shared-nothing" or massively parallel processing environment and has different database partition types (single-partition and multiple-partition).

The multi-partition data BPUs 160 are provided on a server image in groups of eight, each group corresponding to a data BCU 206. In this example, the group of eight data BPUs matches the number of CPUs on an 8-way server. Other configurations that conform to servers with different processing capabilities can be provided. There is no mandatory requirement that the number of BPUs must equal the number of CPUs in a data BCU 206; however, this approach is easy to understand and provides more parallelism for operations that are parallelized at the database partition level only (such as inserts, updates, deletes, runstats, and so on). Each multi-partition data BPU 160 handles a percentage of the large table data within the system. The amount of data that each data BPU 160 can manage will depend on the processing power of the CPUs, the I/O characteristics of the storage, and the complexity of the workload in the environment.

The catalog BPU 152, coordinator BPU 154, and single-partition data BPU 158 have all been provided on a single administration BCU 202; i.e., the coordinator and catalog can be thought of as administration functions. The administration BCU 202 can also serve other administration-like functions, such as an NFS server for the instance home directory, file-system space for raw input data, and so on. In a DB2 embodiment, Query Patroller can also be provided on the administration BCU 202 for systems that employ workload management. This placement simplifies the administration BCU configuration and setup. Query Patroller is a software product that assists in DB2 workload governance. It is pre-emptive, so that queries are costed (based on the expected total resources the query requires) before being released to the DB2 server, and put in queue classes based on this cost. System resources are available to the queries based on the number of queries allowed to execute from each query class.

If an ETL product is used that does transformation work outside the DB2 database, that transformation work should generally be done on a machine that is separate from the data BCUs and the administration BCUs. (An exception may be made if the ETL processes are performed, for example, overnight or when there is little or no database query workload occurring.) This is intended to clearly separate data BCUs from the different type of CPU-intensive and memory-intensive transformation work that commonly occurs with ETL products. This separate ETL machine can then be thought of as ETL BCU 204. There are several ways an ETL product may be used to put data into the database; one possible method, as shown in FIG. 6, is to have the coordinator BPU 156 on the ETL BCU 204.

In many data warehouse systems, ETL is executed during a maintenance window at the end of the day, when no queries are running; however, in many cases, there is no batch window for ETL, and all the processing must occur while queries continue to run on the data warehouse complex. In this situation, it is important that ETL is given adequate resources to finish the work. Preferably, the burden of workload management for ETL is eased by using a separate server or LPAR exclusively for ETL work. It is recommended that this separate set of resources be the ETL BCU.

Figure 7:
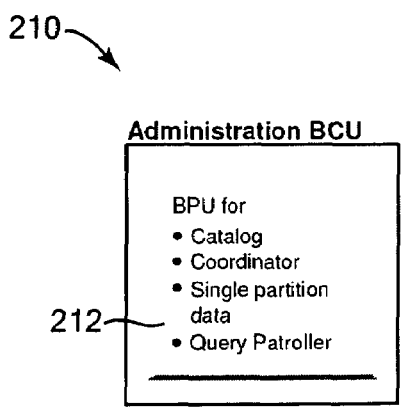
FIG. 7 is a example of an alternate embodiment of an administration BCU.

An example of an alternate embodiment of an administration BCU 210 is shown in FIG. 7. Instead of having separate BPUs as shown in BCU 202 of FIG. 6, administration BCU 210 combines the catalog BPU 152, coordinator BPU 154, and single-partition data BPU 158 into a single BPU 212. Rather than having one database partition for the catalog, another database partition for the coordinator, and a third database partition for the single-partition tables, the administration BCU can be simplified by combining these three database functions into one database partition (BPU). One database partition acts as the catalog partition and coordinator partition, supports small tables (single-partition data), and also supports Query Patroller tables (if installed). The reason that all these partitions are merged is to enhance DB2 performance and usage of these functions.

The embodiment of FIG. 7 is one possible configuration for the administration BCU. Depending on the platform which is implementing the BCU solution, the configuration of the administration BCU may differ. For example, in some situations it may be preferable that additional administration BCUs be added to handle coordinator and Query Patroller functions, and to store single-partition data. In some embodiments, it may not be possible to add additional administration BCUs to scale out the catalog BPU function, since the catalog tables may not be able to be partitioned (as in DB2).

Referring back to the method of FIG. 3, in step 111, it is checked whether high availability (HA) is a requirement of the data system. As discussed above with reference to FIG. 1, high availability allows continuous and/or failover availability of all data in the data warehouse when a failure occurs in a BCU. Tolerance is provided to any single point of failure that may exist at the BCU layer. For example, when a failover situation occurs, the database partition must be restarted on the standby (or failed over) BCU. An outage occurs for applications using the BPUs on that BCU. If the catalog BPU is on the failed BCU, all applications working against that database are affected (as the database is unavailable until the catalog BPU is reactivated). In a failover situation, uncommitted transactions are lost. If using client rerouting, connection information is maintained, and if not using client rerouting, clients must reestablish their connections to the database.

If high availability is not required in the system, then the process continues to step 114, detailed below. If high availability is required, the process continues to step 112, in which a high-availability BCU (HA-BCU) is created from the BCU building blocks as specified in step 110. That is, the BCUs are mapped to one or more HA-BCUs such that each HA-BCU includes one or more BCUs. HA-BCUs provide the implementation relationship between two or more BCUs, and also provide a high-availability solution to the BCU layer.

A number of different ways exist for configuring high availability for DB2 database partitions, and each provides a different level of performance if a failure occurs. Three of these methods are balanced mutual takeover (FIG. 8), hot standby (FIG. 9), and mutual takeover (FIG. 10), described in detail below. Thus, the particular mapping of BCUs to HA-BCUs is dependent on the method used for high availability. After step 112, the process continues to step 114.

In step 114, the BCU architecture of step 110 (and HA-BCU architecture of step 112, if used) is mapped to a physical solution. In this step, the most specific physical description of the solution is made, i.e., the server hardware, the storage devices and capacity, the software to be used, the operating system to be used, communication links, housing, etc., are all specified, based on the BCU architecture developed in the previous steps. The term "physical solution" herein refers to the physical solution architecture, i.e., the specification of physical components that map to the virtual system architecture specified by the BPUs and BCUs as described above.

For example, the physical server image and physical computer resources specified by the BCUs of the specified architecture are mapped to specific physical implementations that implement the image and resources. Thus, an 8-CPU server system defined by a BCU is defined and specified in this step with a particular server system from a particular manufacturer, specifying particular components needed to implement the BCU. The particular hardware, CPU, memory, storage, I/O, software and management utilities required to build a data warehouse are all specified here. The physical data system (final physical solution) is organized based on the virtual system architecture of BCUs and BPUs. Since all the important requirements have already been specified by the BCU architecture, it can be much easier at this step to specify a particular physical solution, rather than attempting to specify particular physical components from scratch.

In addition, the physical solution of step 114 also defines/ specifies how the physical hardware components are put together in order to balance the system for performance and stability, so that the hardware is assembled according to BCU requirements in step 114. For example, the solution can specify that a certain I/O bandwidth is required, so that the hardware must be assembled to achieve this bandwidth. Systems can be assembled and configured in different ways to result in different performances of the system, and so the assembly can be important to achieve the specified balance. The definition of physical hardware configuration provides a completely configured set of hardware, a foundation on top of which to build a data warehouse.

The BCU architecture also defines how the software components including the operating system and database are to be configured on top of this set of hardware from both a physical configuration point of view, but also a logical point of view so that the only item left for the user is to implement his or her data specific needs on top of this logical design. This software configuration is preferably defined after the definition of hardware configuration and assembly discussed above.

The process is then complete at 116.

Further Considerations for the Physical Solution

The development of the VSA as described with respect to FIG. 3 provides a physical solution for a data system. However, beyond the physical definition of the system described above, additional steps can be performed.

For example, after the physical solution of the system is specified with hardware and software, the processes around the data system can be defined in order to make the system operate at peak efficiency. For example, for a data warehouse, processes around the system can include pre-processing of data that allows the data to be readily available from the warehouse and maintains the data warehouse as an ever changing entity that keeps up with the latest information that is to be kept in the warehouse. Other surrounding processes can include backup procedures to other systems and other processes to make the system more robust, fast, and efficient.

After the surrounding processes are defined, a BCU of the specified system can be physically realized and provided, e.g., built from components. It can then be tested, benchmarked and validated such that it performs to all the criteria set out in the design and the user/customer can feel confident that the system does what it was designed to do. For example, for business data warehouse applications, the BCU can be evaluated using a business-intelligence-focused testing plan that includes stages such as quality, performance, and business intelligence solution testing.

Finally, the BCU (and/or multiple BCUs) can then be packaged together as a complete entity and solution and sold as such.

High Availability BCU

The high-availability BCU (HA-BCU) can be defined in different ways, depending on which of the high availability methods is chosen. As indicated above for step 112 of FIG. 3, three methods are described below with reference to FIGS. 8, 9 and 10.

Figure 8:
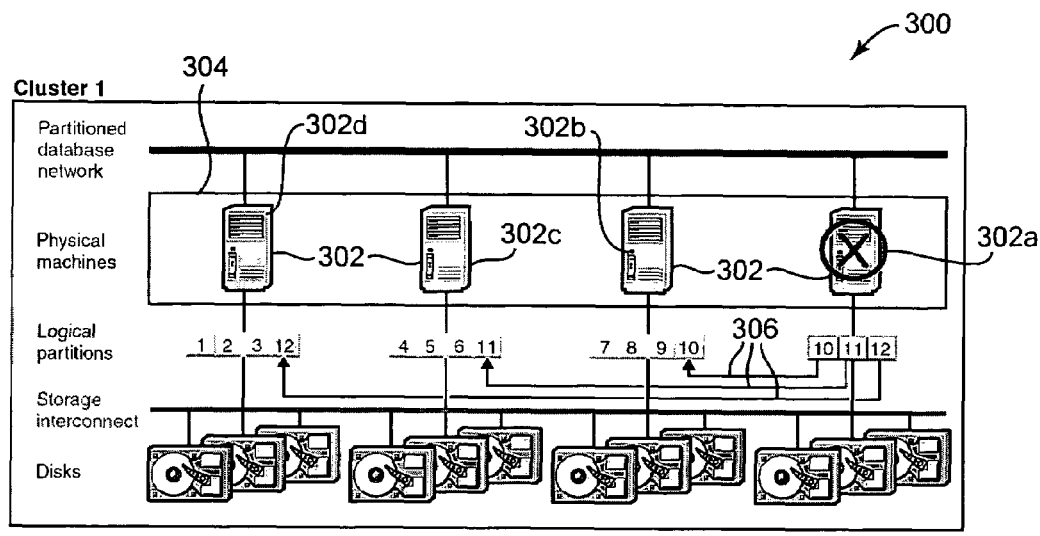
FIG. 8 is a diagrammatic illustration of a system illustrating a balanced mutual takeover method to provide high availability according to the present invention.

FIG. 8 is a diagrammatic illustration of a system 300 illustrating a balanced mutual takeover method to provide high availability according to the present invention. Balanced mutual takeover (also known as clustered takeover) is a technique that can be referred to as the cascade approach, where the BPUs from a failed BCU are spread equally amongst a group of BCUs. This group of BCUs is defined as a cluster of BCUs, forming a single HA-BCU within a system. The system can be defined to include one or more HA-BCUs. This minimizes the performance impact of the failed node on the overall performance of the system, without the need for having spare hot-standby equipment available for takeover. This approach requires all the BCUs in the HA-BCU to have access to each other's storage, which can be achieved through a SAN infrastructure, for example.

FIG. 8 shows an HA-BCU using the balanced mutual-takeover configuration. This configuration can represent the entire system or a subset of it. For example, FIG. 8 shows a system having 12 BPUs (labeled as numbered logical partitions 1-12), which are grouped in a cluster of four BCUs, depicted as physical machines 302, three BPUs to each BCU. The cluster of BCUs 302 form one HA-BCU 304. The entire system is made up of one or more of these HA-BCUs 304. The number of servers (BCUs) in an HA-BCU cluster is a tradeoff between performance requirements in the event of a server failover and availability in the event of multiple server loss.

When physical machine 302a fails, BPU 10 is taken over by machine 302b, BPU 11 is taken over by machine 302c, and BPU 12 is taken over by machine 302d, as indicated by arrows 306. This configuration spreads out the workload to all the other BCUs of the cluster as evenly as possible so that the effects of the failure on the system are minimized.

Figure 9:
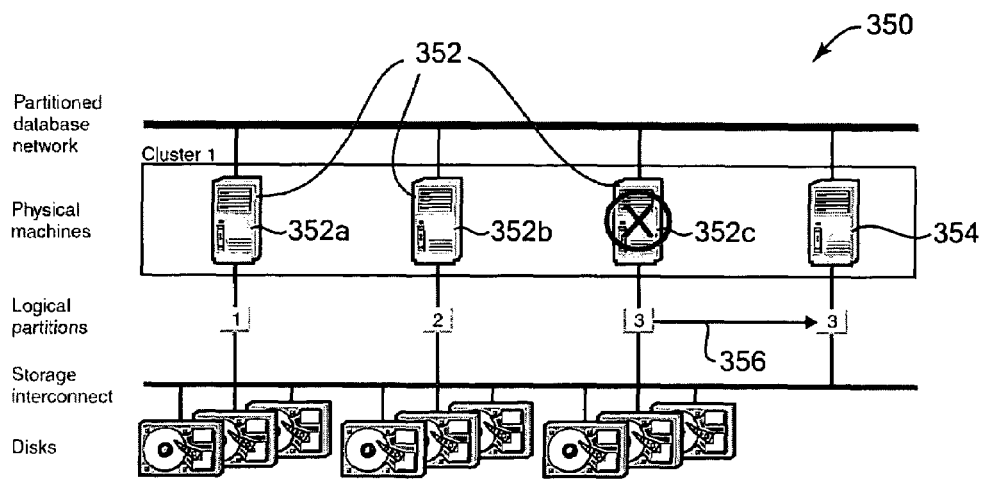
FIG. 9 is a diagrammatic illustration of a system illustrating a hot standby method of the present invention for high availability.

FIG. 9 is a diagrammatic illustration of a system 350 illustrating a hot standby method of the present invention for high availability. A hot standby is a spare BCU that exists within an HA-BCU solely to support one of the primary (production) BCUs in the event of a failure. For example, three production BCUs may exist with one hot-standby BCU, forming an HA-BCU that consists of 4 BCUs. If a single failure occurs in this situation, the performance of the system in takeover can be expected to be the same as in normal operation because the spare BCU has taken over the work of the failed BCU. Note that if a single hot-standby server is used, all the disks for the servers in the group must be visible to the hot-standby server. (Typically the disk-visibility requirement is achieved by having the storage attached via a network infrastructure such as a SAN or an IP iSCSI storage product from IBM Corporation, for example.) When using a single hot-standby server, the performance remains constant only when a single BCU fails. Multiple BCU failures would cause a proportional degradation in performance. Depending on the size of the system, and the expected failure and service levels for the solution, multiple hot-standby servers may be required.

The example of FIG. 9 shows an HA-BCU using the hot standby configuration, where four BCUs (physical machines) are provided, three BCUs 352 being active for normal operation, and one BCU 354 being a hot-standby server that is idle unless there is a failure. In the example shown, three BPUs are provided in the three BCUs, and the four BCUs form one HA-BCU. This configuration can represent an entire system or a subset of it. When a BCU fails, such as BCU 352c, the idle hot standby BCU 354 takes over the processing workload, as indicated by arrow 356.

Figure 10:
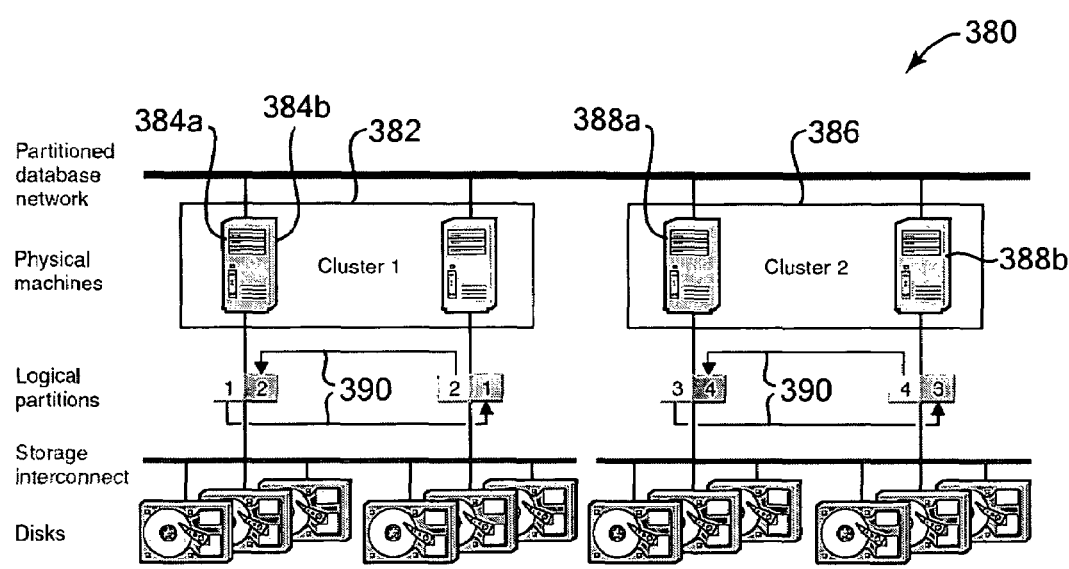
FIG. 10 is a diagrammatic illustration of a system illustrating a mutual takeover method of the present invention for high availability.

FIG. 10 is a diagrammatic illustration of a system 380 illustrating a mutual takeover method of the present invention for high availability. FIG. 10 illustrates mutual takeover between 2 BCUs (servers) within each cluster of BCUs. This approach is commonly used with DB2 UDB, particularly where larger (and more costly) nodes (machines) are being used as the building block for the cluster. This approach is thus a special case of the balanced mutual takeover technique where the HA-BCU is a cluster of two BCUs. In addition, this method is the most straightforward to implement. BCUs are paired together to support each other in the event of a BCU failure. The DB2 database partitions (or other applications) on the failed BCU would migrate to the remaining available BCU in the same cluster. In this situation, up to a 50% drop in system performance can be expected as the one remaining BCU is servicing the requirements of two BCUs: its own and that of the failed BCU. This method has no dependency on a SAN infrastructure to provide access to the storage from multiple nodes; simple twin-tailed disk subsystems will suffice. It is therefore the most common technique used in simple cluster architectures where some form of automated takeover is required. For example, where the storage architecture is direct attached SCSI or Fibre Channel.

FIG. 10 shows a four-BCU system with mutual takeover between BCU pairs, with each pair forming an HA-BCU. Thus, two HA-BCUs are defined, one HA-BCU 382 having two BCUs 384a and 384b, and the other HA-BCU 386 having two BCUs 388a and 388b. If a failover occurs, the BPUs (logical partitions) running on the failed server would be restarted on the remaining server in the mutual takeover pair (HA-BCU), as indicated by arrows 390. This configuration optimizes on more than one server being lost at the same time, in addition to cases where a SAN is not used.

Dynamic Provisioning and Capacity on Demand

The defined nature of the BCU enables one to define entities that the data warehouse (or other system) will run in. One way that this can be accomplished is to build each individual BCU within its own operating system and Computer Logical Partition (LPAR). An LPAR is a defined separation of CPU, memory and I/O all running its own single OS on a server. Some server systems can have multiple LPARs defined within it, each running its own BCU.

One of the additional capabilities provided by an LPAR embodiment is dynamic provisioning (e.g., dynamic LPAR-ing), where resources can be dynamically moved from one LPAR into another. With the defined BCU types, this capability can easily be utilized, specifically between an administration BCU and an ETL BCU.

FIG. 11 is a diagrammatic illustration of an example 400 of dynamic provisioning between BCUs of a system. In this example, an ETL BCU 404 includes 4 CPUs and 16 GB of memory. Typically, an ETL BCU such as BCU 402 will be very busy during off-peak hours of the query work in a data warehouse. To minimize processing time and to maximize system utilization, the LPAR of the system resources of the ETL BCU can be dynamically changed to give it more CPU, memory or I/O capacity to allow it to finish in a much shorter time frame. These additional resources can be taken from the administration BCU 404, as indicated by arrow 406. The administration BCU includes components such as catalog BPU, coordinator BPU, single partition tables, and Query Patroller tables, as well as 4 CPUs and 16 GB of memory. Part of the resources of the administration BCU, such as memory or CPU processing, can be provisioned to the ETL BCU. This will not hurt the functionality of the administration BCU because the utilization of the administration BCU will likely be low during off-peak hours.

Another technology which can be exploited with the present invention is "capacity on demand." Capacity on demand refers to the ability for a user to only pay for the system resources that the user actually uses.

FIG. 12 is a block diagram illustrating an example system 420 having capacity on demand. The administration BCU 422 includes several components, as well as 4 CPUs and 16 GB of memory. There is also the ability to use 4 CPUs, shown in block 424, on demand. For example, a user may buy an 8-way CPU machine, but only pay for 4 of the CPUs in the machine, leaving the additional 4 CPUs as inactive, but potential capacity on demand. The user may use the additional CPUs whenever he or she needs to and will only pay for when they are used. There is typically an additional premium for this ability, but can be economical in certain situations.

Capacity on demand, when combined with the BCU architecture, enables a given infrastructure to take advantage of capacity on demand pricing. This can easily be used in conjunction with, for example, the monthly ETL processing, quarterly batch reports and financial reporting. During these times of peak usage, additional capacity can be given to the administrator BCU to handle additional concurrent users and applications, or can be given to the ETL BCU to enable it to finish large monthly batch jobs that have too short of a time window to allow it to finish. Capacity on Demand also enables specific data warehouse growth scenarios. For example, a data warehouse may be configured as if it is on an 8 CPU system, and the capacity on demand virtualization can be configured so that the system looks like an 8 CPU system. However, there will only be 4 physical CPUs enabled underneath this architecture. This enables an additional 4 CPUs to be enabled when required and only purchased at that time when they are enabled with little to no configuration changes required on the architecture built on top. Users can then create and configure the warehouse of their future needs, but only pay for the warehouse of their current needs.

EXAMPLE EMBODIMENTS

Figure 13:
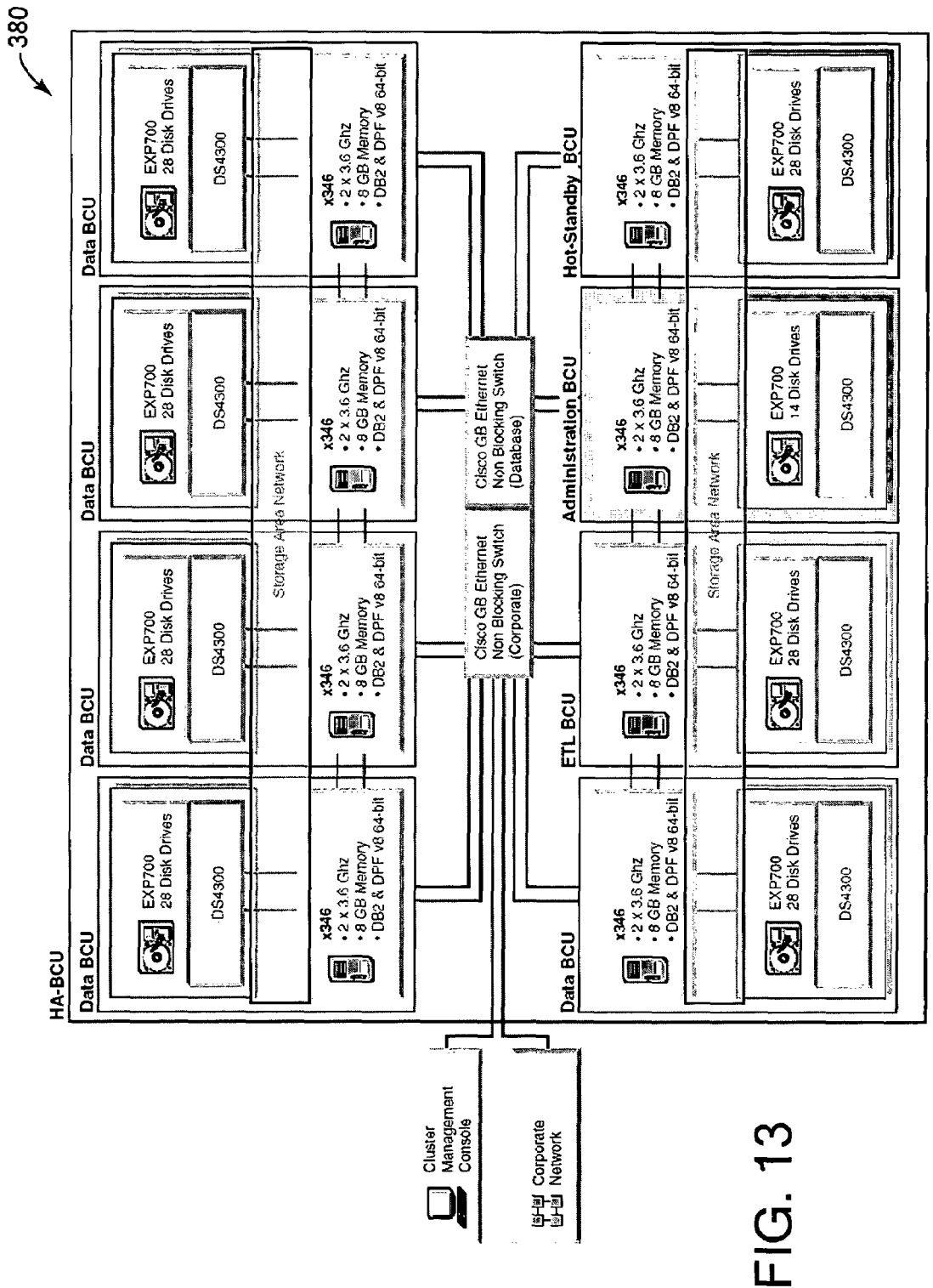
FIG. 13 is an example of a physical configuration mapped to the VSA architecture of the present invention.

One example of a physical configuration 380 mapped to the VSA architecture of the present invention is shown in FIG. 13. This embodiment uses the Linux operating system. Four types of Linux BCU are shown: a data BCU for partitioned data, an administration BCU, an ETL BCU, and a standby BCU for high availability. The data BCU includes DB2 database partitions that support tables with partitioned data. The administration BCU hosts different functions, including the catalog and one or more coordinator partitions. Finally, ETL processing with CPU and memory-intensive transformation performed by ETL tools will often require a separate server—an ETL BCU (or a cluster of ETL BCUs).

The server shown is an IBM-Intel Xeon-based 2U server, the x346. This server enables 64-bit operation and memory support to DB2. This node serves as the standard building block for all the BCUs. Other servers can be used in other embodiments, such as the AMD-based e326, which offers broadly similar performance characteristics. This example incorporates Enterprise class storage technology using the IBM TotalStorage® DS4300 storage server.

Figure 14:
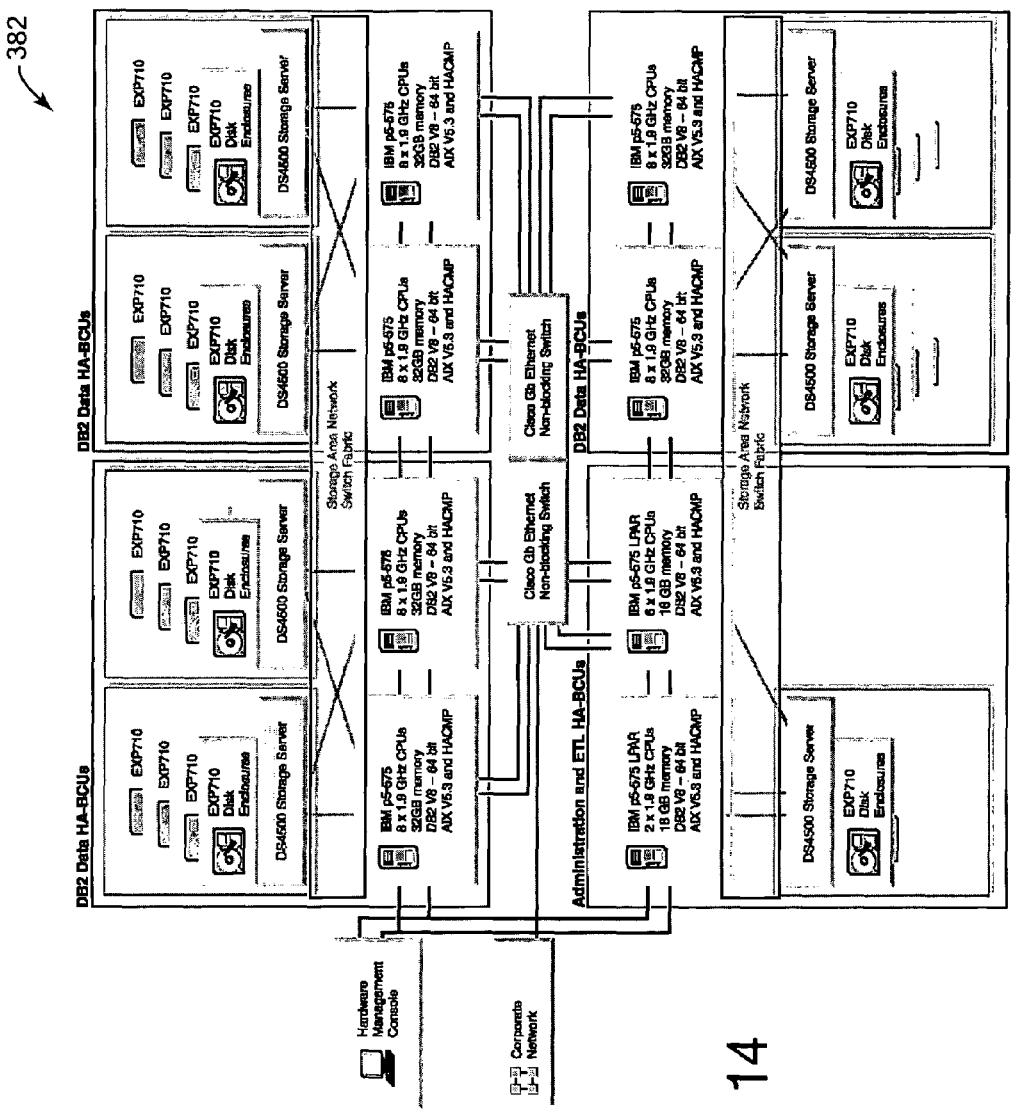
FIG. 14 another example of a physical configuration mapped to the VSA architecture of the present invention.

Another example of a physical configuration 382 is shown in FIG. 14. This embodiment uses the DB2® database and the AIX® operating system from IBM Corporation. The software stack is targeted for large warehouse environments. DB2 UDB with DPF is architected as a shared-nothing application.

Three common types of BCUs are shown: a data BCU for multi-partition data, an administration BCU, and an ETL BCU. The server used for the data BCU in this example is an IBM eServer™ p5-575 that uses the densely packaged IBM POWER5™ chip technology. A Hardware Management Console (HMC) is part of the solution to enable the advanced system management capabilities of the p5-575 servers.

Three logical networks are used: one for the HMC console and associated system administration functions; one for the DB2 internal communications between database partitions on different servers; and one for connection access to a customer's corporate network. The networks for DB2 and access to the corporate network are high-speed Gigabit Ethernet connections that require a switching technology to meet the typical performance demands of large commercial warehouses. Each of these logical networks consists of two adapters or ports for communication redundancy. The HMC network uses an integrated 10/100 BaseT Ethernet port and an Ethernet hub integrated in the system rack.

The BCU solution incorporates Enterprise class storage technology using the IBM TotalStorage® DS4500 storage server. A SAN implementation is used to provide flexibility for storage configurations and provide LAN-free backup/restore capability. The SAN configuration provides a high performance 2 Gbps SAN fabric, which allows for redundant paths to disk storage. The use of multiple SAN switches creates a SAN fabric with redundant paths from server to storage.

The highly-available solution here minimizes single points of failure. Servers are configured in a mutual fail-over mode for high availability, and are configured with active redundant Fibre Channel adapters for storage and backup, along with active redundant adapters for each Gigabit Ethernet network. Dual network switches are configured to provide multiple network paths.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing an architecture for a computer data system, the method comprising:

defining, prior to physically building and implementing the computer data system, a virtual solution architecture that includes a plurality of balanced partition units (BPUs), each BPU defined by a combination of specified resources required to operate the BPU and provide a balanced operation for that BPU, the resources including processing power, memory, input/output capability, and software, each BPU characterized by the balanced operation that includes using each resource efficiently for system operation and avoiding underutilization of the resources, the virtual solution architecture being mappable to a plurality of different physical hardware configurations, wherein the defining of the virtual solution architecture includes expanding the BPUs into a balanced configuration unit (BCU) architecture, wherein the BCU architecture includes at least one BCU, and the at least one BCU includes at least one of the BPUs, wherein the at least one BCU includes one or more system components specified more generally than in the physical solution architecture; and mapping the virtual solution architecture to a physical solution architecture for the computer data system, the physical solution architecture being a particular one of the different physical hardware configurations, wherein the mapping includes mapping the BCU architecture to the physical solution architecture for the computer data system, the physical solution architecture specifying particular hardware and software products to implement the at least one BCU.

2. The method of claim 1 wherein the computer data system is a data warehouse, and wherein the BPU includes balanced computer resources used by a data partition of a database.

3. The method of claim 1 wherein defining a BPU includes determining a type for each of the at least one BPU, and determining resource requirements for each type of BPU used in the computer data system.

4. The method of claim 3 wherein the types of BPU include at least one of a data BPU, a catalog BPU, a coordinator BPU, and an extract-transform-load (ETL) BPU.

5. The method of claim 1 further comprising scaling the number of building blocks to satisfy desired workload characteristics of the computer data system and to meet overall data system requirements.

6. The method of claim 1 wherein a BCU specifies physical computing resources and a system image of computer hardware and software.

7. The method of claim 1 wherein the physical solution architecture includes a specification of particular physical components to be used to physically implement the computer data system, the particular physical components including particular hardware and software products.

8. The method of claim 1 further comprising creating a high availability BCU (HA-BCU) which includes one or more of the BCUs, and which provides high availability of system resources in the event of a failure of one or more BCUs in the HA-BCU.

9. The method of claim 8 wherein the HA-BCU is specified using a balanced mutual takeover method, in which BPUs from a failed BCU are spread equally amongst a group of BCUs provided in the HA-BCU.

10. The method of claim 8 wherein the HA-BCU is specified using a hot standby method, in which the HA-BCU includes an idle BCU, the idle BCU taking over BPUs from a failed BCU within the HA-BCU.

11. The method of claim 8 wherein the HA-BCU is specified using a mutual takeover method, in which the HA-BCU includes two BCUs, and wherein if one of the BCUs in the HABCU fails, the other BCU in the HA-BCU takes over the BPUs of the failed BCU.

12. The method of claim 1 wherein at least a portion of resources of one BCU can be dynamically provisioned to a second BCU to allow the second BCU more efficient performance during high demand.

13. The method of claim 1 wherein one of the BCUs provided in the virtual solution architecture is not used during normal system operation, and wherein a capacity of the computer data system can be increased by allowing use of the unused BCU upon demand of a user.

14. The method of claim 1 wherein the using of each resource efficiently and avoiding of underutilization of resources includes:
avoiding a shortage of memory during operation of the computer data system, and avoiding an emergence of extra processing power and extra bandwidth that is unutilized during operation of the computer data system.

15. A data warehouse system comprising:
at least one data balanced configuration unit (BCU), the at least one data BCU including a number of data balanced partition units (BPUs), each data BPU corresponding to a combination of specified resources required to operate the data BPU, the resources including processing power, memory, input/output capability and software, wherein the resources are used by a data partition of a database and are balanced for each data BPU, the balance including using each resource efficiently for system operation and avoiding underutilization of the resources, the data BPU storing partitioned database data; and
an administration BCU, the administration BCU including a catalog BPU corresponding to a combination of specified resources required to operate the catalog BPU, wherein the resources are used by a database partition where a database catalog resides and are balanced for the catalog BPU, the balance including using each resource efficiently for system operation and avoiding underutilization of the resources,
wherein the data BCU and the administration BCU are defined with a virtual solution architecture that specifies open, general-purpose system components of the data BCU and the administration BCU, the virtual solution architecture defined prior to physically building and implementing the computer data system, the virtual solution architecture mappable to a plurality of different physical solution architectures, each physical solution architecture specifying particular hardware and software products to physically implement the data BCU and administration BCU more specifically than in the virtual solution architecture.

16. The data warehouse system of claim 15 wherein the administration BCU further includes a coordinator BPU that manages user database connections to the data warehouse and coordinates processing of user queries.

17. The data warehouse system of claim 15 further comprising at least one of:
an extract-transform-load (ETL) BCU that processes the extraction, transformation, and loading of data to and from the data warehouse; and
an application BPU that is responsible for processing a user application that interfaces with the data warehouse.

18. A computer data system comprising:
a plurality of balanced partition units (BPU), each BPU corresponding to a combination of specified resources required to operate the BPU, the resources including processing power, memory, input/output capability and software, wherein the resources are used by a data partition of a database and are balanced for each data BPU that includes using each resource efficiently for system operation and avoiding underutilization of the resources; and
at least one balanced configuration unit (BCU), wherein the at least one BCU includes at least one of the BPUs and wherein the at least one BCU specifies a system image of computer hardware and software,
wherein the at least one BCU is defined with a virtual solution architecture that specifies the system image using open, general-purpose system components, the virtual solution architecture defined prior to physically building and implementing the computer data system, a virtual solution architecture the virtual solution architecture mappable to a plurality of different physical solution architectures, each physical solution architecture specifying particular hardware and software products to physically implement the at least one BCU more specifically than in the virtual solution architecture.

19. The computer data system of claim 18 wherein the data system is a data warehouse, and wherein each BCU is a computer partition or individual server, and wherein the plurality of BPUs include at least one data BPU that corresponds to balanced computer resources used by a data partition of a database, the data BPU storing partitioned database data.

20. The method of claim 15 wherein the number of data BCUs includes a plurality of data BPUs, each of the data BPUs being identical, wherein the number of the data BPUs has been scaled to satisfy desired workload characteristics of the computer data system.

* * * * *